Patented June 15, 1937

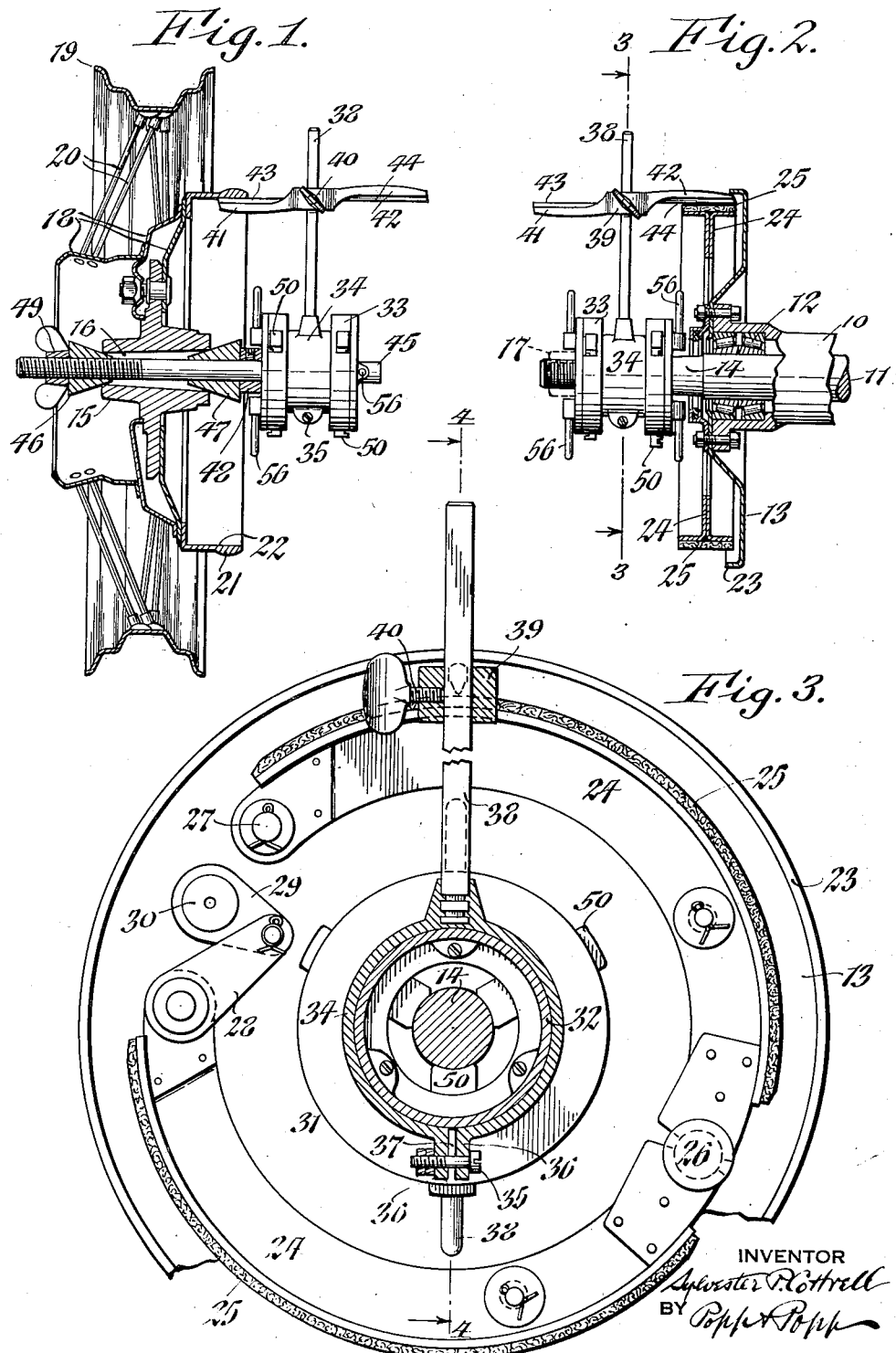

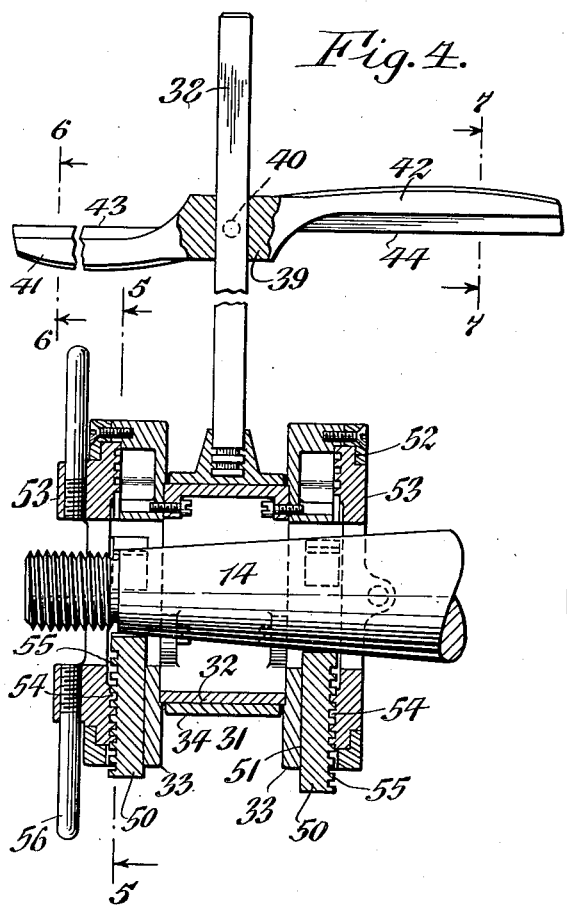
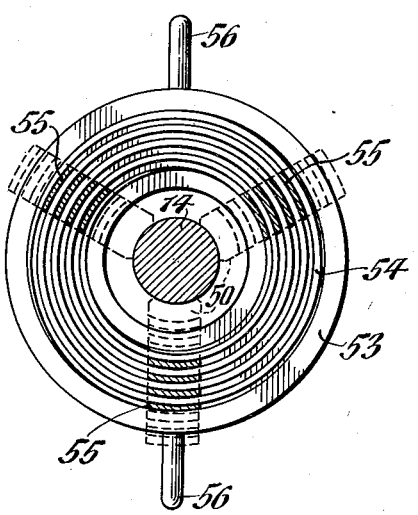
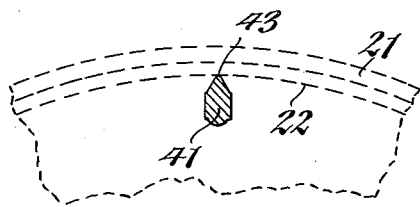
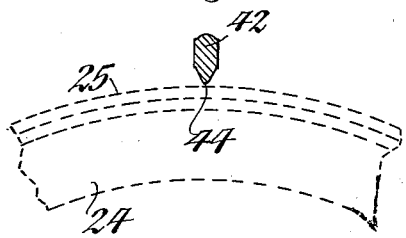
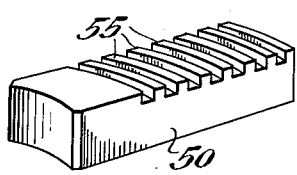

2,083,944

UNITED STATES PATENT OFFICE 2,083,944

BRAKE SETTING APPARATUS

Sylvester P. Cottrell, Buffalo, N. Y.

Application January 23, 1936, Serial No. 60,474

1 Claim. (Cl. 33—180)

This invention relates to a brake setting apparatus for facilitating the adjustment of the shoes of the brake mechanism on automobiles and similar installations.

Heretofore it has been common practice when assembling, repairing or renewing the brake mechanism to set the shoes by guess work as near as possible in the required position for obtaining the proper working of the same and then by repeated try-outs change the adjustment of the shoes until they are finally so located with reference to the brake surface of the brake drum that the latter is properly engaged by the shoes when the brake mechanism is applied. This practice is objectionable on account of the great amount of time which is usually wasted and thus necessarily involving unnecessary expense and also laying up the vehicle idle an undue length of time while doing this work. In this prior method of setting the brake mechanism the work obviously was done in the dark and as the correct setting of the brakes was only obtained by chance there was always the possibility of the brakes being too tight and thus wear rapidly or the same might be too loose and thus prevent efficient application of the brake mechanism.

It is the object of this invention to provide a brake setting or gage mechanism whereby the shoes of the brake mechanism of automobiles and similar installations may be accurately set while the shoes and their actuating means are disassembled from the brake drum so that upon assembling the shoes with the brake drum the same will fit and function properly without requiring any further trials to determine the same, thereby materially reducing the time usually spent in doing work of this character and the expense incident thereto.

In the accompanying drawings:

Fig. 1 is a vertical longitudinal section of an automobile wheel and the brake drum thereon and an approved form of gage mechanism embodying this invention applied to the brake drum for determining the diameter of the bore or brake surface thereof preparatory to assembling the brake shoes therewith.

Fig. 2 is a similar section showing the gage mechanism used for locating the brake shoes so that the same when assembled with the drum will fit the latter without necessitating further adjustment.

Fig. 3 is a fragmentary vertical transverse section, on an enlarged scale, taken on line 3—3, Fig. 2.

Fig. 4 is a vertical longitudinal section of the gage mechanism, on an enlarged scale, applied to the axle of an automobile.

Fig. 5 is a vertical transverse section, taken on line 5—5, Fig. 4.

Figs. 6 and 7 are vertical transverse sections of the gage arms, taken on the correspondingly numbered lines on Fig. 4.

Fig. 8 is a perspective view of one of the jaws of the chucks whereby the gage mechanism is mounted on the axle of an automobile.

In the following description similar characters of reference indicate like parts in the several figures of the drawings.

Although this gage mechanism may be advantageously used for setting different kinds of brake mechanisms of various types of automobiles it is more particularly designed for use in connection with an automobile having a brake mechanism which is constructed as follows:—

The numeral 10 represents a part of the rear axle housing of an automobile running gear or chassis and 11 part of a driving axle or shaft which is journaled in the housing by means of a roller bearing 12 or otherwise. On each end of the housing is arranged a stationary support 13 for part of the brake mechanism which support in the present case preferably has the form of a disk and constitutes the inner wall of a casing which encloses the brake mechanism. At its outer end the axle terminates in an axle arm or shank 14 preferably of tapering form upon which the hub 15 of a wheel is secured in any suitable manner, for instance by engaging the shank 14 with a conical bore 16 in this hub and applying a screw nut 17 to the outer end of the shank, as shown by dotted lines in Fig. 2. Other parts of the wheel may be of any suitable and well known construction, that shown in Fig. 1 being merely typical of one now in common use and comprising an inner circular shell 18 secured to the wheel hub, a felly 19 surrounding the hub and adapted to receive a rim and tire of any desired construction, and spokes 20 or the like connecting the felly and hub shell.

On the inner side of the wheel is arranged a brake drum 21, the bore of which forms an internal cylindrical brake surface 22 which is adapted to be engaged by the shoes of the brake mechanism when applying the same. This brake drum is connected at its outer edge with the hub shell 18 and in the assembled condition of the wheel and axle the inner edge of the brake drum is arranged within a peripheral flange 23 on the supporting disk 13 and forms with the same an enclosure for the internal working parts of the brake mechanism.

In the present brake mechanism the shoe portion thereof comprises two curved brake shoes 24 arranged within the brake drum on opposite sides of the axis of the drum, axle and wheel and provided on their outer sides with external curved brake surfaces 25 adapted to engage with the internal brake surface of the drum. The opposing ends of the brake shoes are pivotally connected by a pin 26 and the other end of one of these shoes is pivoted on the supporting disk 13 by a pin 27 while the corresponding end of the companion shoe is connected by a link 28 with a crank or rock arm 29. The latter is carried by the inner end of a rock shaft 30 which is journaled in the disk 13 and adapted to be operated by manually controlled means of any suitable character. Upon turning the crank arm in one direction the brake shoes are spread or moved outwardly so that their outer brake surfaces contact with the internal brake surface of the drum and thus operate to retard or stop the rotation of the wheel. Upon turning the crank arm 29 in the opposite direction the brake shoes are retracted inwardly out of engagement from the brake surface of the drum this permitting the wheel to rotate freely.

When the brake contacting surfaces of the drum and the shoes become worn and require renewal or the brake mechanism requires repairs it becomes necessary to separate the wheel and brake drum from the axle and brake shoes in order to afford access to the parts for this work and after the drum and shoes have been relined or such other repairs have been made which are necessary the wheel and drum are again assembled in their operative relation.

Preparatory to reassembling the wheel and axle after making the required renewals or repairs above mentioned, it has been the practice heretofore to adjust the brake shoe operating means by guess work for the purpose of bringing the brake shoes into such a position that their contacting surfaces will properly engage the contacting surfaces of the brake drum upon applying the brake mechanism and also disengage the brake shoes from the drums upon releasing the brake mechanism. This haphazard method of setting the brake mechanism often involved repeated adjustments and trial of the mechanism before the desired result was attained and thus incurred waste of time and expense attending such work.

The gage mechanism forming the subject of this invention renders it possible to accurately set the brake shoes in such position preparatory to assembling the same with the brake drum that these members will accurately fit each other and function perfectly without requiring any further attention, thereby effecting a substantial saving in time and cost of doing such work.

In its preferred form the gage mechanism of this invention is constructed as follows:—

The numeral 31 represents a main support which is adapted to be mounted on a part having a definite relation to the brake drum and to the brake shoes for the purpose of determining the location of the contacting surfaces between these members. In its preferred form this support is of tubular shape and comprises a central cylindrical body 32 and two circular hollow heads 33 arranged at opposite ends of the body and being of larger diameter than said body. Mounted on this body between said heads and rotatable circumferentially thereon is a carrier 34 which preferably has the form of a sleeve and this may be held in any desired radial position on the periphery of the support body by a clamping device which in the present case consists of a clamping bolt or screw 35 connecting two lugs arranged at the opposite ends of a radial split or gap 37 in the sleeve shaped carrier, as shown in Fig. 3. When the bolt 35 is loose the carrier may be freely turned about the body of the support and at this time longitudinal movement of the carrier is prevented by the heads 33, 33 between which it is confined.

Projecting laterally from the carrier is a radial supporting arm or rod 38 of square cross section, the inner end of which is preferably cast in the carrier so as to practically form an integral part of the same. On this arm is mounted for radial adjustment toward and from the axes of the carrier gage means, for locating or determining the contacting surfaces of the brake drum and shoes. In its preferred form this gage means comprises a collar 39 slidable radially on the rod 38, this collar having a square hole which fits this rod and is adapted to be held in the desired position thereon by a fastening screw 40, and two gage fingers 41, 42 projecting from opposite sides of the collar 39 and arranged lengthwise of the axis of the carrier sleeve. One of these gage fingers is provided with an outwardly facing gage edge 43 and the other with an inwardly facing gage edge 44, these gage edges being in line with each other and parallel with the axis of the rotary carrier 34.

Holding means are provided for temporarily securing the support 32 on the shank 14 of the axle and on an arbor 45 which is temporarily secured to the hub of the wheel preparatory to measuring or locating the contacting surfaces of the brake shoes and drum and determining the position of their contacting surfaces so that the brake mechanism can be set to operate most efficiently and properly without repeated tryouts.

The temporary arbor is inserted in the hub of the wheel and secured therein so that it is in axial alinement therewith by means of two cones 46, 47 mounted on the arbor and engaging their small ends with opposite ends of the wheel hub. One of these cones engages its outer end with a stop or shoulder 48 on the arbor and the other cone is engaged on its outer end by a screw nut 49. By tightening the latter the arbor is secured to the hub in a centered position relative thereto and upon loosening the same the arbor may be removed from the hub in order to permit the wheel to be placed on the axle and the brake mechanism to be assembled in operative condition.

The holding means for temporarily securing the gage support to the axle arm 14 or to the arbor 45 preferably comprises two chuck-like and centering gripping devices each of which in the form shown in the drawings is constructed as follows:—

The numeral 50 represents a plurality of gripping jaws, preferably three in number, arranged on each head 33 equidistant around the axis of the same and each guided in a radial guideway 51 on the respective head so that the same is movable toward and from the axis of the gage support. Rotatably mounted in a bearing 52 in the outer end of the respective head 33 is a shifting ring 53 which is provided on its inner side with a volute thread 54 which engages with teeth 54 on the several gripping jaws 50 of the respective holding and centering chuck. Upon turning the shifting rings in one direction by means of handles 56 projecting laterally therefrom the several holding jaws 50 may be moved inwardly engaging the periphery of the axle arm 14 or the arbor 45 fastening the gage mechanism in its centered position thereto and upon turning these rings in the opposite direction the jaws are disengaged from the axle arm or arbor to permit the gage device to be detached therefrom.

Assuming that the wheel has been removed from the axle and that the repairs and replacements of linings and the like have been made on the cooperating contacting surfaces of the drum and shoes and the parts associated therewith and the wheel and axle are still separated, the operator now attaches the temporary arbor 45 to the hub of the wheel so that the same is in the axial center thereof, as shown in Fig. 1. The tubular supporting body of the gage device is now slipped over that end of the arbor 45 which is beyond the inner side of the hub and drum on the wheel and securely clamps the same thereon in axially centered position relatively thereto by tightening the jaws 50 of the gripping chucks at both ends of the gage body, as shown in Fig. 1. After this the gage member is moved outwardly on the radial arm 38 of the carrier until the outwardly facing gage edge 43 of the gage finger 41 bears against bore or brake surface 22 of the brake drum, as shown in Figs. 1 and 6, and then the gage member is held in this position on the arm 38 by tightening the screw 40. The gage edge of this finger when contacting the bore of the brake drum accurately indicates or measures the working diameter of the brake drum and if the gage device has been properly mounted on the arbor and the bore of the contact surface 22 of the drum is true then the gage finger 41 should bear uniformly against all parts of this surface upon turning the gage arm 38 and body 34 about the axis of the arbor and drum.

The position of the gage member on the gage arm is now utilized to adjust the brake shoes and the means for operating them so that these shoes will be set in the proper position and permit of being properly operated without requiring more than one assemblage of the parts.

To accomplish this the gage supporting body and the parts mounted thereon are removed from the arbor 45 without disturbing the position of the gage member 41, 42 and then this supporting body is slipped onto the arm 14 of the axle so that the other gage finger 42 overhangs the peripheral zone of the brake shoes, as shown in Fig. 2. The gage supporting body is held in this position and properly centered relative to the axle by tightening the clamping chucks so that the two sets of jaws at opposite ends of the gage body grip the axle arm 14 and hold these parts in axial alinement with each other, as shown in Figs. 2, 3 and 4. One of the brake shoes is now moved outwardly so that its brake surface 25 which is adapted to contact with the brake surface of the drum bears against the inwardly facing gage edge 44 of the gage finger 42, as shown in Figs. 2 and 7, and then the gage carrier 34 is turned circumferentially on the gage body 34 to the diametrically opposite side of the axle and the other brake shoe is likewise moved outward until its contact surface 25 bears against the gage edge of the finger 42. The brake operating mechanism is now adjusted in accordance with these set positions of the brake shoes. It will be noted that at this time the contact zone of the shoes is of the same diameter as the contact zone of the drum because the shoes have been set outwardly against the inner gage edge 44 of the finger 42 which is in line with the outer gage edge 43 of the finger 41 which has previously been set against the bore of the brake drum thereby causing these two contact zones to be of the same diameter.

The gage device is now removed from the axle arm 14, the arbor 45 is detached from the hub of the wheel, and the latter is mounted on the axle so that the brake drum surrounds the brake shoes and the parts are in their proper relation for operation.

Upon now applying the brake mechanism the shoes will be expanded against the drum so as to produce the proper retarding effect on the rotation of the wheel and when the brake mechanism is released the shoes will retract from the drum the requisite extent to permit the wheel to rotate freely and avoid any dragging effect on the same.

It will now be apparent that by the use of this apparatus it is possible to effect a proper and certain setting of the brake shoes and the parts associated therewith by one adjustment of the parts before the same are assembled, thus avoiding repeated putting on and taking off the wheel when effecting this adjustment piece meal as has been the custom heretofore.

In its general organization this apparatus is comparatively simple in construction, the same can be used readily and conveniently, and the same has no parts which are likely to get out of order.

I claim as my invention:—

An apparatus for setting a brake shoe relative to a brake drum of the brake mechanism of a wheeled vehicle having an axle provided with a tapering axle arm, an axle housing in which said axle is journaled, a wheel mounted on said axle arm, a brake drum mounted on the wheel, and brake shoes mounted on said housing and adapted to engage said drum; comprising a cylindrical arbor adapted to be placed axially within the hub of said wheel, cones mounted on said arbor and adapted to engage opposite ends of the hub, means for clamping said cones against said hub and releasing the same, a support mounted on said arbor and provided with a bearing which is adapted to be mounted concentrically to said drum, independent clamping devices arranged at opposite ends of said support and adapted to engage either with different parts of said cylindrical arbor or with different parts of the tapering axle arm, a carrier rotatable on said bearing, and gage means mounted on said carrier and adjustable toward and from the axis thereof for determining the position of contact surface of said brake shoes and the position of the surface of said drum which is contacted by said brake shoes.

SYLVESTER P. COTTRELL.